(12) United States Patent
Kim et al.

(10) Patent No.: US 7,102,722 B2
(45) Date of Patent: Sep. 5, 2006

(54) LIQUID CRYSTAL DISPLAY AND A FABRICATING METHOD THEREOF

(75) Inventors: Jeong Hyun Kim, Kyoungki-do (KR); Jae Hong Jun, Seoul (KR); Hyun Kyu Lee, Seoul (KR); Yong Bum Kim, Seoul (KR); Hyun Sang Chung, Kyoungki-do (KR); Nack Bong Choi, Kyoungki-do (KR); Jung Il Lee, Seoul (KR)

(73) Assignee: LG.Philips LCD Co., Ltd., Seoul (JP)

( * ) Notice: Subject to any disclaimer, the term of this patent is extended or adjusted under 35 U.S.C. 154(b) by 7 days.

(21) Appl. No.: 10/266,740

(22) Filed: Oct. 9, 2002

(65) Prior Publication Data

US 2003/0214620 A1  Nov. 20, 2003

(30) Foreign Application Priority Data

May 16, 2002  (KR) .............................. P2002-27182

(51) Int. Cl.
G02F 1/1339 (2006.01)
(52) U.S. Cl. ....................................................... 349/155
(58) Field of Classification Search ................ 349/155, 349/123, 143
See application file for complete search history.

(56) References Cited

U.S. PATENT DOCUMENTS

| | | | | |
|---|---|---|---|---|
| 5,739,882 A | * | 4/1998 | Shimizu et al. | ............. 349/123 |
| 6,441,880 B1 | * | 8/2002 | Utsumi et al. | ............. 349/155 |
| 6,501,527 B1 | * | 12/2002 | Hirose et al. | ............... 349/155 |
| 6,812,990 B1 | * | 11/2004 | Hofmann et al. | ........... 349/156 |

FOREIGN PATENT DOCUMENTS

| | | | |
|---|---|---|---|
| JP | 3-246521 | * | 11/1991 |
| JP | 6-324357 | * | 11/1994 |
| JP | 2001-83314 | | 3/2001 |

* cited by examiner

*Primary Examiner*—Toan Ton
(74) *Attorney, Agent, or Firm*—Morgan, Lewis & Bockius, LLP

(57) ABSTRACT

A liquid crystal display device includes an upper substrate, a lower substrate, a liquid crystal layer between the upper and lower substrates, a transparent electrode consisting of at least two layers of transparent material provided on at least one of the upper and lower substrates and a spacer material jetted onto the transparent electrode by an ink-jet system, wherein the spacer material has a hydrostatic property different from one of the at least two layers of the transparent electrode.

15 Claims, 11 Drawing Sheets

LIQUID CRYSTAL DISPLAY AND A FABRICATING METHOD THEREOF

The present invention claims the benefit of Korean Patent Application No. P2002-27182 filed in the Republic of Korea on May 16, 2002, which is hereby incorporated in its entirety by reference.

BACKGROUND OF THE INVENTION

1. Field of the Invention

This invention relates to a liquid crystal display, and more particularly to a liquid crystal display and a fabricating method thereof wherein a spacer is positioned for keeping a cell gap.

2. Description of the Related Art

Generally, a liquid crystal display (LCD) controls the light transmittance of each liquid crystal cell in response to a video signal. Accordingly, a picture is displayed corresponding to the video signals on an LCD panel having liquid crystal cells arranged in a matrix. To this end, the LCD panel includes an active area having liquid crystal cells arranged in a matrix and driving circuits for driving the liquid crystal cells in the active area.

Referring to FIG. 1, a conventional LCD includes an upper plate consisting of a black matrix 20, a color filter 16, a common electrode 14 and an upper alignment film 12 that are sequentially provided on the upper substrate 11. The conventional LCD also includes a lower plate consisting of a lower substrate 1 on which a thin film transistor (TFT) 25/6/26/27/28/30, a pixel electrode 22 and a lower alignment film 10 are sequentially provided. In addition, the conventional LCD includes a spacer 24 and a liquid crystal (not shown) provided between the upper plate and the lower plate.

In the lower plate, the TFT includes a gate electrode 25 connected to a gate line (not shown), a source electrode 28 connected to a data line (not shown), and a drain electrode 30 connected, via a contact hole 23, to the pixel electrode 22. Further, the TFT includes a gate insulating film 6 for insulating the gate electrode 25, and an active semiconductor layer 26 on the gate insulating film 6 for creating a conductive channel between the source electrode 28 and the drain electrode 30 when a gate voltage is applied to the gate electrode 25. As shown in FIG. 1, ohmic semiconductor layers 27 are provided between the active layer 26 and the source/drain electrodes 28 and 30 and doped with an impurity for ohmic contacts between the active semiconductor layer 26 and the source electrode 28, and between the active semiconductor layer 26 and the drain electrode 30.

When a gate signal is applied to the gate line of the TFT, a data signal from a data line can be switched through the TFT to the pixel electrode 22. As a result, the liquid crystal is rotated by means of a voltage difference between a data signal applied to the pixel electrode 22 via the TFT and a common voltage Vcom applied to a common electrode 14. Accordingly, light transmission quantity through the liquid crystal is determined by the arrangement of the liquid crystal.

The pixel electrode 22 is positioned at an area adjacent to the intersection of a data line and a gate line, and is made from a transparent conductive material having a high light transmittance. The pixel electrode 22 is provided on a protective film 8 that is on the surface of the lower substrate 1, and is electrically connected, via a contact hole 23 in the protective film 8, to the drain electrode 30. An upper portion of the lower substrate 1, provided with the pixel electrode 22, is coated with an alignment film 10 that is subjected to a rubbing process, which completes the assembly of the lower plate.

The black matrix 20 of the upper plate is formed on the upper substrate 11 in correspondence with the TFT area of the lower plate and an area adjacent to the intersection of a gate line and a data line. The black matrix 20 also defines a liquid crystal cell area in which a color filter 16 will be formed. Further, the black matrix 20 plays a role in preventing light leakage and absorbing an external light such that contrast can be enhanced. The color filter 16 is formed in the cell area as defined by the black matrix 20. The color filter 16 specifically transmits a wavelength of light for a certain color, such as red, green or blue. The common electrode 14 is formed on the color filter 16. An indium-tin-oxide (ITO) with good light transmittance is used as the common electrode 14. Typically, indium-tin-oxide has a hydrostatic property of being hydrophobic. The alignment film 12 is formed by coating an alignment material, such as polyimide, on the common electrode 14 and by performing a rubbing process thereon.

Ball spacers, like ball spacer 24, are sprinkled onto either one of the upper plate or the lower plate of the LCD panel by means of a jet nozzle to keep a gap between the upper plate and the lower plate. The ball spacers should be uniformly distributed for the purpose of keeping a uniform cell gap of the LCD panel. However, it is difficult to uniformly distribute ball spacers due to the randomness in any sprinkling system. If the ball spacers are not uniformly distributed in the LCD panel, the cell gap in individual liquid crystal cells may not be uniform such that a stain-like appearance phenomenon is created in one or more areas on the LCD panel. In addition, if a user applies a pressure to the screen at the exterior of the LCD panel when ball spacers are used, a ripple phenomenon can occur in which the picture on the LCD panel has darkened areas shaped like waves. The darkened wave-shaped areas occur because the ball spacers have been shifted around between the upper plate and the lower plate.

Recently, there has been a study to provide a spacer that is fixed and patterned at a specific location to overcome the disadvantages of the ball spacer 24 and its sprinkling system. Hereinafter, a manufacturing method of the pattern spacer will be described with reference to FIGS. 2A to 2C and FIG. 3. More particularly, FIGS. 2A to 2C are cross-sectional views showing a process of manufacturing a conventional pattern spacer, which will be described in conjunction with FIG. 3, which is a flow chart.

A spacer material 42a, as shown in FIG. 2A is coated onto a substrate 40, as referred to in step S31 of FIG. 3. The substrate 40 can be either one of the upper plate or the lower plate provided with the TFT. The spacer material 42a is a material that is mixed with a solvent, a binder, a monomer and a photo-initiator. As referred to in step S32 of FIG. 3, the spacer material 42a is subject to a pre-curing to eliminate a solvent within the spacer material 42a, thereby making the spacer material 42a into a paste-like state.

Subsequently, as shown in FIG. 2B, a photo mask 44 having a transmission part 44a and a shielding part 44b is aligned on the spacer material 42a. As referred to in step S33 of FIG. 3, when an ultraviolet (UV) ray is radiated onto the spacer material 42a through the photo mask 44, the spacer material corresponding to the transmission part 44a is exposed to the ultraviolet ray.

As shown in FIG. 2C and referred to in step S34 of FIG. 3, the spacer material 42a is patterned. When the spacer material 42a is developed using a negative process, the spacer material 42a that is not exposed to the ultraviolet ray is removed while the spacer material that is exposed to the ultraviolet ray is left. When the spacer material 42a is developed using a positive process, the spacer material 42a that is exposed to the ultraviolet ray is removed while the spacer material that is not exposed to the ultraviolet ray is left. As referred to in step S35 of FIG. 3, the spacer material 42a patterned in this manner is cured to form spacers 42 having a desired height.

The spacers 42 for keeping a cell gap in the LCD can occupy about 20% of the entire area in a liquid crystal cell. If the spacer 42 is formed by the above-mentioned photolithography technique, then more than 95% of the coated spacer material 42a is wasted as a result of a spin-coating process of the photolithographic spacer material. Thus, the conventional photolithography wastes a lot of material in forming the spacer 42 and is inconvenient in that it requires a complex five-step process.

To reduce the waste of material and the number of process step, there has been a spacer formation method suggested using an ink-jet device as shown in FIGS. 4A to 4C. As shown in FIG. 4A, an ink-jet device 50 is aligned to correspond to a formation position of the spacer 58. In this alignment state, ink from the ink-jet device 50 is jetted to the substrate 40. The substrate 40 corresponds to at least one of the upper and lower plates of a LCD panel. The ink-jet device 50 jets ink using a thermal system or a piezoelectric system. Typically, the latter system is used. The ink-jet device 50 using the piezoelectric system consists of a vessel 52 for containing a material to be jetted, and an inkjet head 54 for jetting a material from the vessel 52.

The vessel 52 is filled with the spacer material 58, and the ink-jet head 54 is provided with a piezoelectric device and a nozzle 56 for jetting the spacer material 58 from the vessel 52. When a voltage is applied to the piezoelectric device, then a physical pressure is generated to cause a capillary phenomenon in which a flow path between the vessel 52 and the nozzle 56 repeatedly contracts and relaxes. Due to this capillary phenomenon, the spacer material 58 jets out of the nozzle 56 onto the substrate 40, as shown in FIG. 4A. Then, a curing process is used that exposes the spacer material 58 on the substrate 40 to an ultraviolet ray from a light source (not shown). Thus, the spacer material 58 can be hardened into a spacer 59, as shown in FIG. 4B.

Since the spacer material 58 has a hydrostatic property of being hydrophilic, the spacer 49 does not have good adhesion with the common electrode 14 that is also hydrophobic. Although the spacer may have a minimum height for keeping the cell gaps between the upper plate and the lower plate of the LCD panel, the lack of adhesion between the spacer and a plate of the LCD panel enables the spacers to move around.

SUMMARY OF THE INVENTION

Accordingly, the present invention is directed to a liquid crystal display and a fabricating method thereof that obviates one or more of the problems due to limitations and disadvantages of the related art.

An object of the present invention is to provide a liquid crystal display device and a fabricating method thereof wherein the adhesion of a spacer is increased to prevent a spacer from moving around within an LCD panel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an embodiment of the invention for a liquid crystal display includes an upper substrate, a lower substrate, a liquid crystal layer between the upper and lower substrates, a transparent electrode including of at least two layers of transparent material provided on at least one of the upper and lower substrates and a spacer material jetted onto the transparent electrode by an ink-jet system, wherein the spacer material has a hydrostatic property different from one of the at least two layers of the transparent electrode.

In another embodiment, a liquid crystal display device includes an upper substrate, a lower substrate, a liquid crystal layer between the upper and lower substrates, a material layer with a surface that has a surface area with a first hydrostatic property and a spacer jetted onto the material layer by an ink-jet system and having a second hydrostatic property different from the first hydrostatic property.

In another embodiment, a liquid crystal display device includes an upper substrate, a lower substrate, a liquid crystal layer between the upper and lower substrates, a material having a first hydrostatic property provided on at least one of the upper and lower substrates and a spacer between the upper and lower substrates having a second hydrostatic property different from the first hydrostatic property.

In another embodiment, a method of fabricating a liquid crystal display device includes the steps of forming a transparent electrode by depositing at least two transparent material layers on at least one of an upper and lower substrates, jetting a spacer material onto the transparent electrode by an ink-jet system, wherein the spacer material has a hydrostatic property different from one of the at least two layers of the transparent electrode, and providing a liquid crystal between the upper and lower substrates.

In another embodiment, a method of fabricating a liquid crystal display device includes the steps of treating a surface area of a material layer to change the hydrostatic property of the surface area, jetting a spacer material onto the surface area with an ink-jet system and providing a liquid crystal on the material layer.

In another embodiment, a method of fabricating a liquid crystal display device includes the steps of providing a material having a first hydrostatic property on a substrate, jetting a spacer material with a second hydrostatic property onto the material on the substrate with an ink-jet system; and providing a liquid crystal on the substrate.

Additional features and advantages of the invention will be set forth in the description which follows, and in part will be apparent from the description, or may be learned by practice of the invention. The objectives and other advantages of the invention will be realized and attained by the structure particularly point out in the written description and claims hereof as well as the appended drawings.

BRIEF DESCRIPTION OF THE DRAWINGS

The accompanying drawings, which are included to provide further understanding of the invention and are incorporated in and constitute part of this specification, illustrate embodiments of the invention and together with the description serve to explain the principals of the invention.

DETAILED DESCRIPTION OF THE PREFERRED EMBODIMENTS

Figure 1:
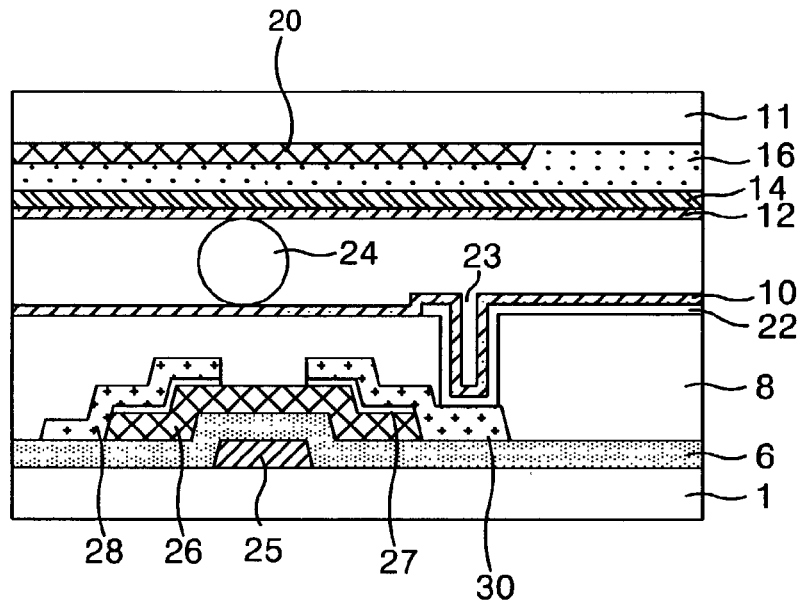
FIG. 1 is a cross-sectional view showing a structure of a conventional liquid crystal display.
Figure 2A:
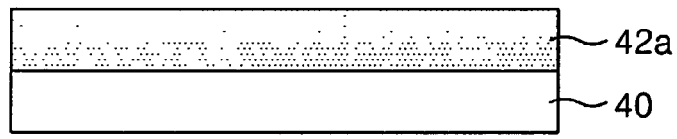
FIG. 2A to FIG. 2C are cross-sectional views representing a process of manufacturing a conventional pattern spacer.
Figure 2B:
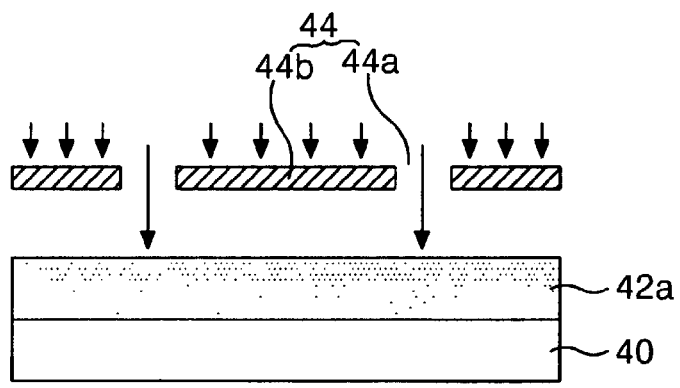
Figure 2C:
Figure 3:
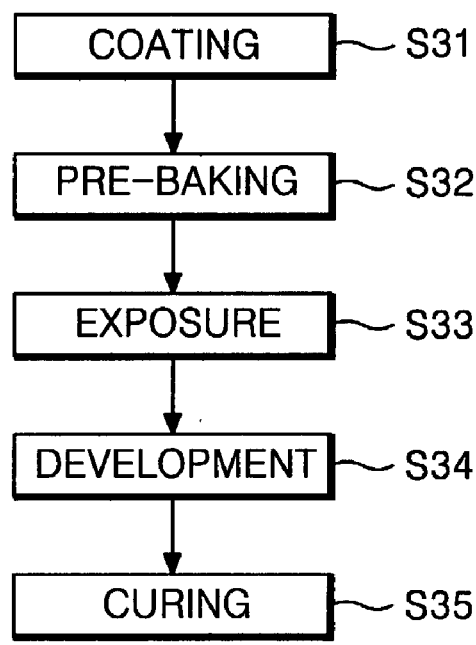
FIG. 3 is a flow chart representing the spacer manufacturing method shown in FIG. 2.
Figure 4A:
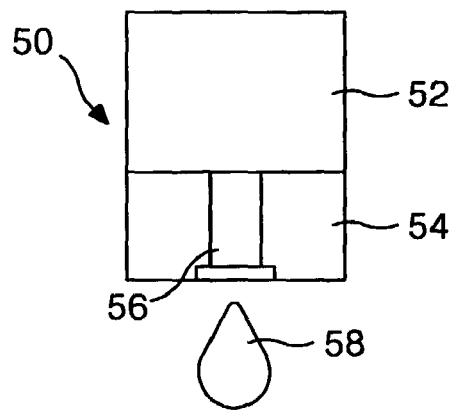
FIG. 4A and FIG. 4B depict a conventional spacer manufacturing method employing an ink-jet system.
Figure 4A:
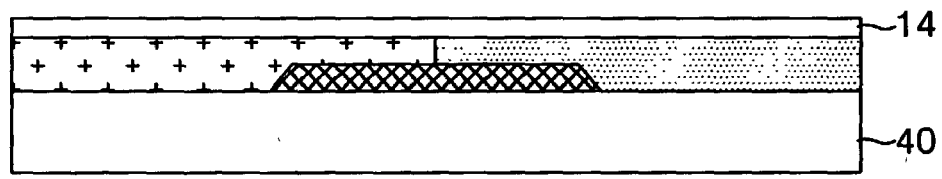
Figure 4B:
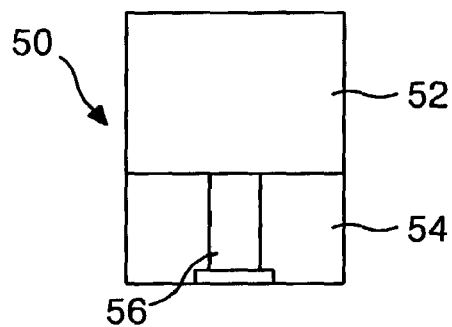
Figure 4B:
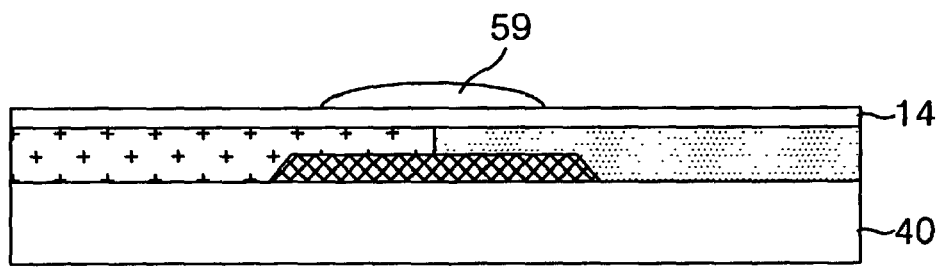
Figure 5A:
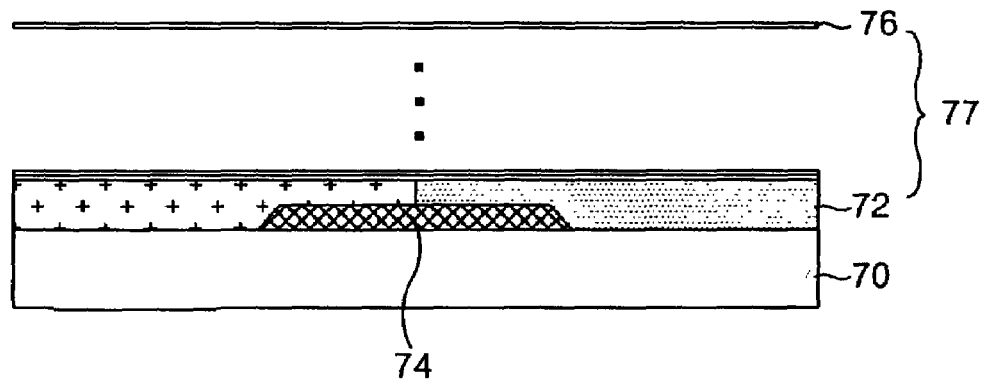
FIGS. 5A to 5C depict a method of fabricating a liquid crystal display employing an ink-jet system according to an embodiment of the present invention.
Figure 5B:
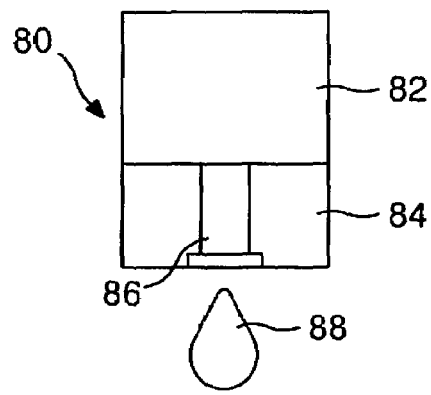
Figure 5B:
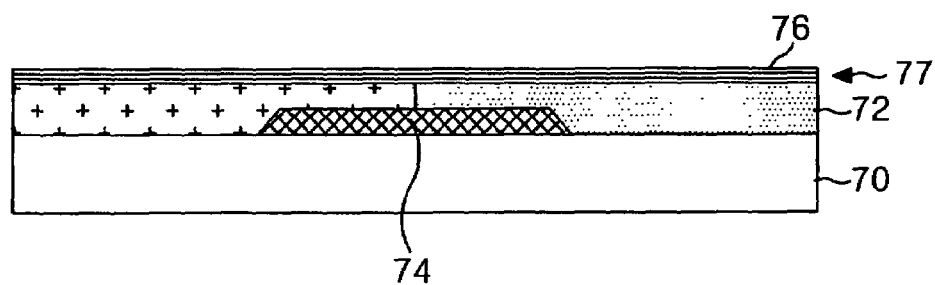
Figure 5C:
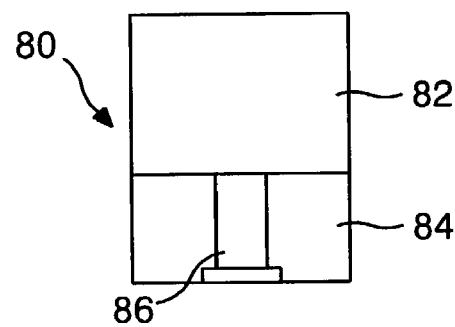
Figure 5C:
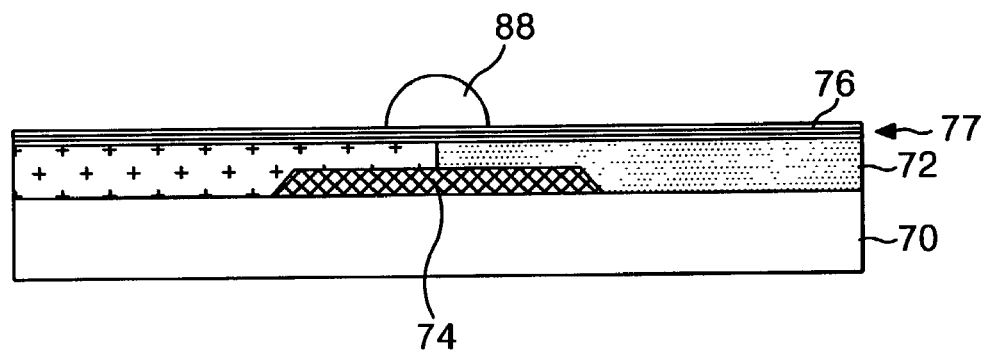

Referring to FIGS. 5A to 5C, a liquid crystal display (LCD) according to a first embodiment of the present invention includes a black matrix 74 provided on an upper substrate 70 to define a cell area, a color filter 72 provided on the cell area defined by the black matrix 74, a common electrode 77 provided on the color filter 72 and made of a plurality of transparent electrode layers 77, and a spacer 88 jetted on the top layer 76 of the multiple layer common electrode 77 with an ink-jet device 80.

The black matrix 74 defines a cell area in which the color filter 72 is formed, and prevents light leakage and absorbs external light to thereby enhance picture contrast. The color filter 72 is formed in the cell area defined by the black matrix 74. The color filter 72 transmits a specific wavelength of light color, such as red, green or blue. The multiple layer common electrode 77 includes a plurality of transparent electrode layers, each of which is formed of, for example, indium-tin-oxide (ITO) that has good light transmittance and good conductivity. The top surface electrode layer 76 or upper layers of the multiple layer common electrode 77 have relativly less light transmittance and less conductivity than the lower layers. However, the top surface electrode layer 76 or upper layers have the hydrostatic property of being hydrophilic as opposed to the lower layers, which are hydrophobic.

Hereinafter, a method of fabricating a liquid crystal display according to the present embodiment will be described with reference to FIGS. 5A to 5C. First, as shown in FIG. 5A, a black matrix 74, a color filter 72 and a multiple layer common electrode 77 are provided on an upper substrate 70. While depositing the ITO material in forming layers of the multiple layer common electrode 77, the $O_2$ gas input into the deposition process of the ITO is increased as each layer is deposited so that the top surface electrode layer has a hydrophilic property. The $O_2$ gas changes a hydrostatic property of the ITO material in that the ITO is changed form hydrophobic to hydrophilic as the $O_2$ gas concentration is increased. Thus, the resulting top layer 76 of the multiple layer common electrode 77 has a hydrophilic property. The hydrostatic property of the ITO material is changed without reducing the resistivity or transmittance of the multiple layer common electrode 77 significantly as a whole.

Next, as shown in FIG. 5B, after an inkjet device 80 is aligned at a position corresponding to the black matrix 74, a spacer material 88 is jetted onto the multiple layer common electrode 77. The ink-jet device 80 includes a vessel 82 for containing the spacer material 88 to be jetted, and an ink-jet head 84 for jetting the spacer material from the vessel 82. The vessel 82 is filled with the spacer material 88, and the ink-jet head 84 is provided with a piezoelectric device and a nozzle 86 for jetting the spacer material 88 contained in the vessel 82. When a voltage is applied to the piezoelectric device, a physical pressure is generated on the spacer material 88 caused by a capillary phenomenon in which the flow path between the vessel 82 and the nozzle 86 repeatedly contracts and relaxes. Due to this capillary phenomenon, the spacer material 88 is-jetted through the nozzle 86.

A hydrostatic property of the spacer material 88 is that it is hydrophobic. Since the spacer material 88 has a hydrophobic property and the top surface layer 76 of the multiple layer common transparent electrode 77 has a hydrophilic property, adhesion between the top transparent electrode layer 76 and the spacer material 88 increased. Thus, the subsequently cured spacer will not easily separate from the top transparent electrode layer 76 or move around.

Figure 6A:
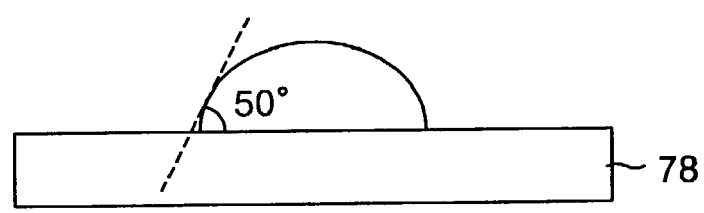
FIG. 6A represents the contact angle of water to a hydrophobic surface of a single ITO layer of a conventional art device.

The hydrostatic property of a conventional common electrode 78, that is a single layer, will be explained in reference to FIGS. 6A and 6B by comparison to the multiple layer common electrode 77 according to the embodiment of the present invention. As shown in FIG. 6A, if water ($H_2O$) is dropped on the conventional single-layer common electrode 78, then a contact angle of water with respect to the ITO film is about 50°. Since the conventional common electrode 78 has a hydrophobic property while water has a hydrophilic property, a contact angle is large.

Figure 6B:
FIG. 6B represents contact angle of water to a hydrophilic surface of multiple ITO layers in accordance with the present invention.

On the other hand, as shown in FIG. 6B, if water is dropped on the multiple layer common electrode 77 according to the embodiment of the present invention, a contact angle of water with respect to the top surface common electrode layer 76 becomes about 27°. This is because the top surface common electrode layer 76 has a hydrophilic property as a result of increasing the $O_2$ gas injection into the deposition process for each ITO layer as each layer is deposited until the top surface electrode layer has a hydrophilic property. Since the top surface electrode layer 76 is hydrophilic, the multiple layered common electrode 77 attracts or mixes well with water.

Figure 7A:
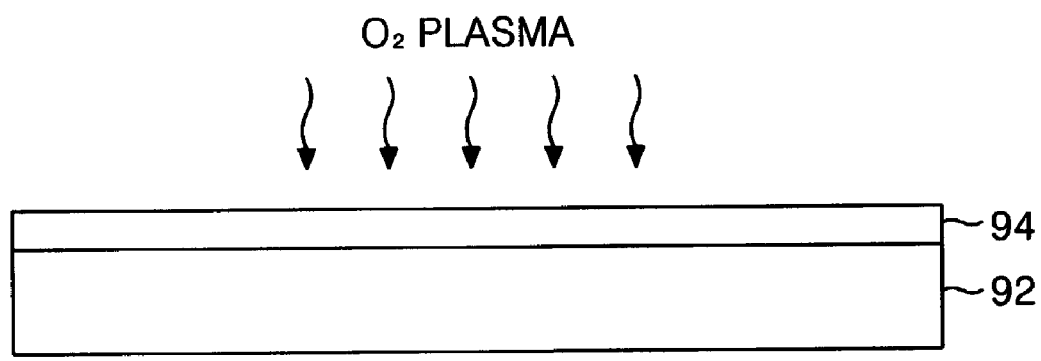
FIGS. 7A to 7C depict a method of fabricating a liquid crystal display according to a second embodiment of the present invention.
Figure 7B:
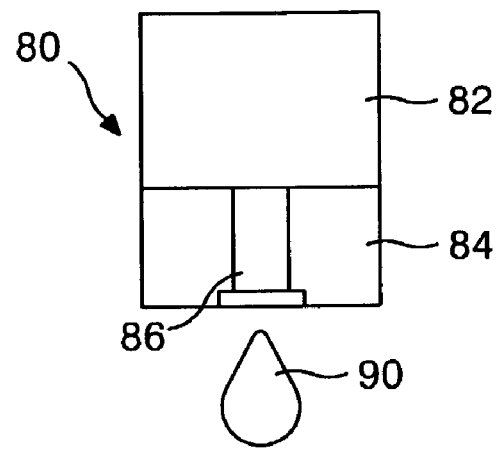
Figure 7B:
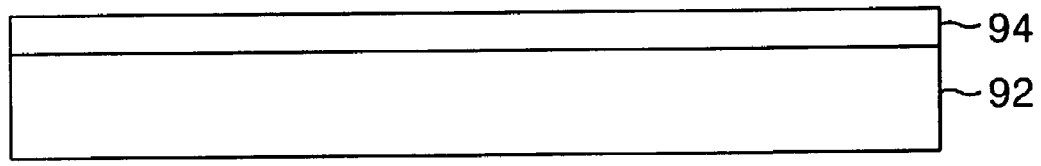
Figure 7C:
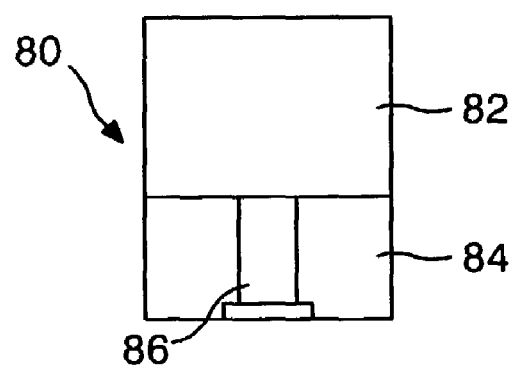
Figure 7C:
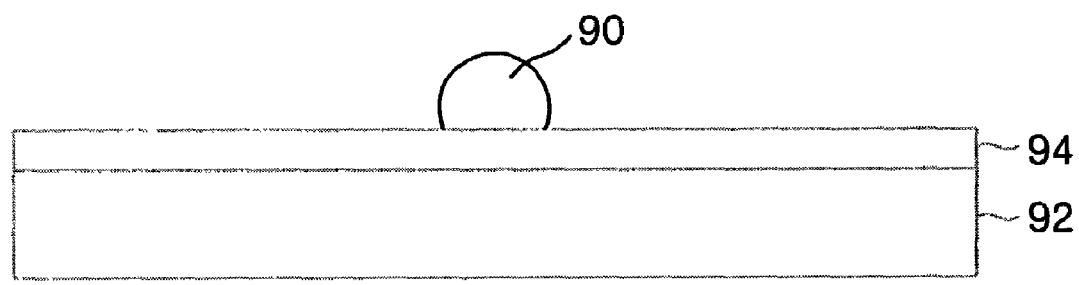

FIGS. 7A to 7C show a method of fabricating a liquid crystal display according to a second embodiment of the present invention. Referring to FIG. 7A, a film 94 having a hydrophobic surface is provided on a substrate 92. For example, the substrate can be the upper plate or lower plate of an LCD panel. The film 94 can be an ITO film. In the alternative, the film 94 can be an organic film or inorganic film, for example, silicon nitride ($SiN_x$) used on portions of an ITO film or in lieu of the ITO film to create surface areas having a hydrophobic surface. For example, the film 94 can be an inorganic or organic film on portions of the lower plate of an LCD in which the pixel electrode is not present. The surface of the film 94 is subjected to an $O_2$ or $H_2$ plasma treatment, thereby changing the hydrostatic property of the surface of film 94 from a hydrophobic property to a hydrophilic property. In the alternative, the surface of the film 94 can be changed to have a hydrophilic property by utilizing an acid solution treatment, a basic solution treatment, an ion beam treatment or an ultraviolet ray treatment instead of the $O_2$ or $H_2$ plasma treatment.

Subsequently, as shown in FIG. 7B, an ink-jet device 80 is aligned to a black matrix (not shown) under the ITO film of the upper plate of an LCD panel or to an area of the lower plate of an LCD panel in which the pixel electrode is not present. Then the spacer material 90 is jetted onto the film 94. If the spacer material 90 has a hydrophobic property and is jetted onto the film 94 having a surface with a hydrophilic property, then the contact angle between the film 94 and the spacer material 90 will be increased, as shown in FIG. 7C. The increased contact angle increases the height of the spacer while minimally increasing the width of the spacer for obtaining a specified cell gap with increased aperture. Subsequently, a solvent within the spacer material 90 is evaporated through a curing process to harden the spacer material 90 into a spacer.

Figure 8A:
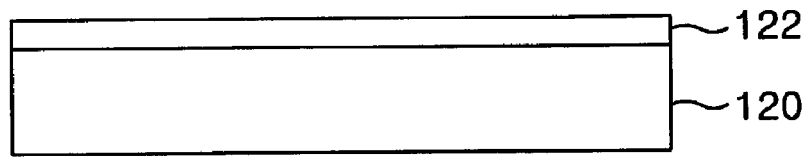
FIGS. 8A to 8C depict a method of fabricating a liquid crystal display according to a third embodiment of the present invention.
Figure 8B:
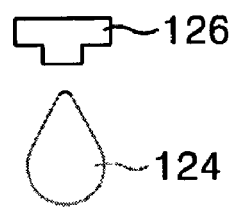
Figure 8B:
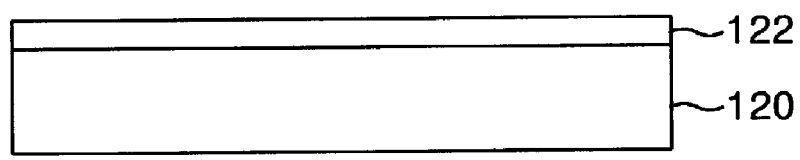
Figure 8C:
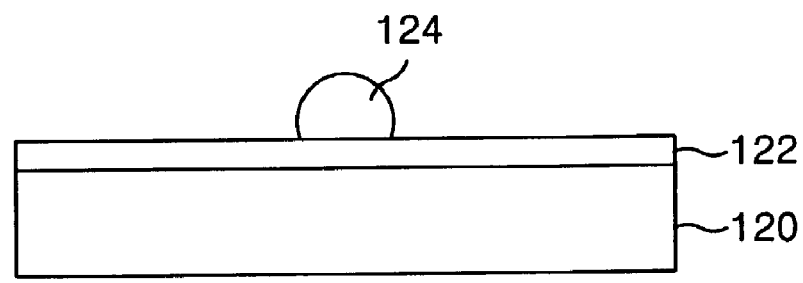

FIGS. 8A to 8C show a method of fabricating a liquid crystal display according to a third embodiment of the present invention. Referring to FIG. 8A, a material 122 having a hydrophilic property is coated onto a substrate 120. In an alternative, an ink-jet device can be used to coat the substrate 120 with the material 122 for good adhesion. The substrate 120 can be an upper plate or a lower plate of the liquid crystal display panel.

Next, as shown in FIG. 8B, an ink-jet device 126 is aligned on the substrate at a position on which a spacer is to be formed. Then, a spacer material 124 is jetted onto the substrate 120. The spacer material 124 has a hydrostatic property of being hydrophobic.

As shown in FIG. 8C, the spacer material 124 jetted from the ink-jet device 126 that is positioned upon the hydrophilic material 122 of the substrate 120. Since the spacer material 124 is a hydrophobic material, the hydrophilic material 122 repulses the spacer material to thereby enlarge a contact angle between the hydrophobic spacer 124 and the hydrophilic material 122. Accordingly, a formation height of the spacer 124 is more enlarged than the prior art, so that it becomes possible to easily make the spacer 124 corresponding to a desired suitable height of the cell gap. Thus, when the hydrophobic spacer material is dropped onto a hydrophilic material after the hydrophilic material was coated on the substrate 120, it becomes possible to set a height of the spacer.

FIGS. 9A to 9D show a method of fabricating a liquid crystal display according to a fourth embodiment of the present invention.

Figure 9A:
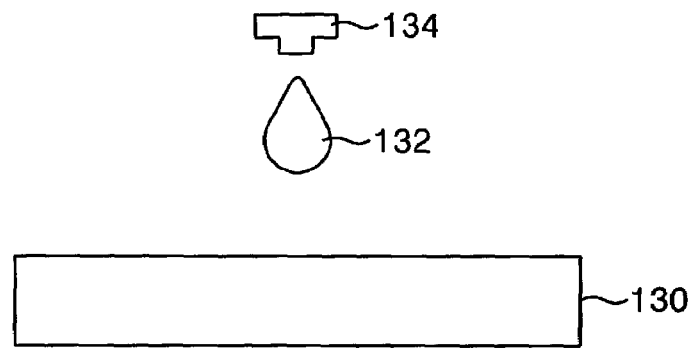
FIGS. 9A to 9D depict a method of fabricating a liquid crystal display according to a fourth embodiment of the present invention.
Figure 9B:
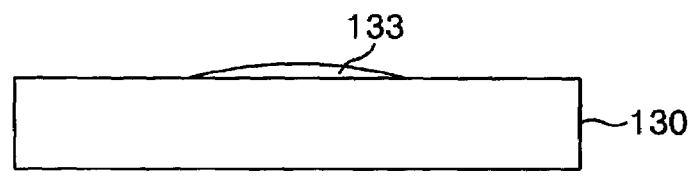

First, as shown in FIG. 9A, an ink-jet device 134 is aligned on a substrate 130 to drop a hydrophilic material 132 in correspondence with a spacer area. The substrate 130 may be an upper plate or a lower plate of the liquid crystal display panel. The hydrophilic material 132 jetted from the ink-jet device 134 is formed to be spread somewhat widely on the substrate 130 for good adhesion, as shown in FIG. 9B.

Figure 9C:
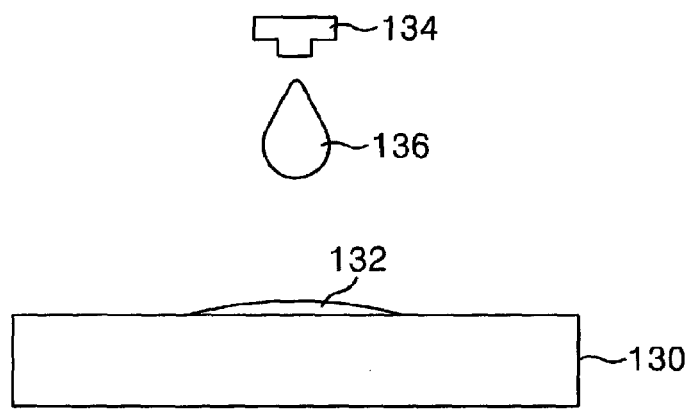
Figure 9D:
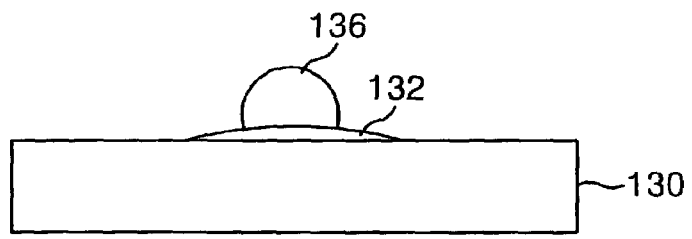

Next, after curing the hydrophilic material 132, the ink-jet device 134 in which a hydrophobic spacer material 136 is contained is aligned to jet the hydrophobic spacer material 136 onto said hydrophilic material 132, as shown in FIG. 9C. The hydrophobic spacer material 136 does not necessarily need to undergo a curing process. Because the spacer material 136 is a hydrophobic material having a property repulsing from the hydrophilic material 132, it can be formed at a larger height or with a greater contact angle than in the related art. In other words, the hydrophobic spacer material 136 is positioned upon the hydrophilic material 132 as shown in FIG. 9D to thereby enlarge a contact angle between the spacer 136 and the hydrophilic material 132. Accordingly, a formation height of the spacer 136 can be set to a desired suitable height for the cell gap. For example, a formation height of the spacer 136 can be approximately 3 to 5 μm. Thus, when the hydrophobic spacer material is dropped onto a hydrophilic material after the hydrophilic material was dropped on the substrate 130, it becomes possible to set a height of the spacer.

Figure 10A:
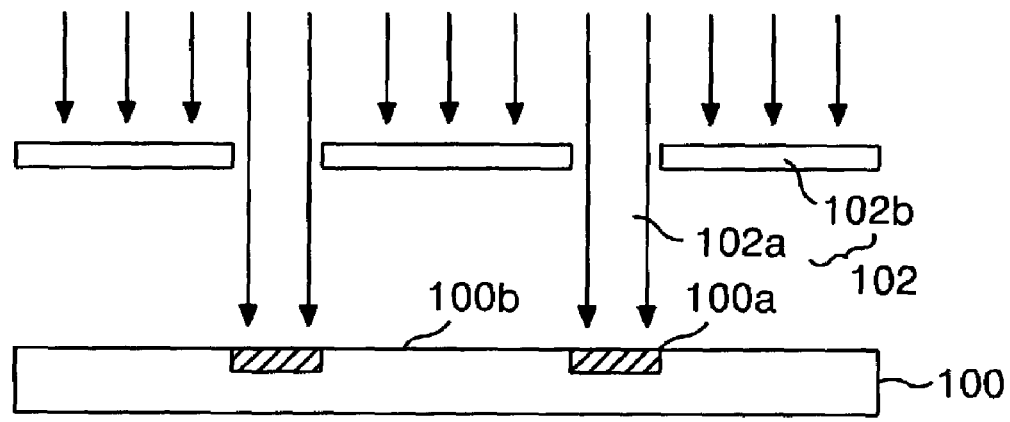
FIGS. 10A to 10B depict a method of fabricating a liquid crystal display according to a fifth embodiment of the present invention.
Figure 10B:
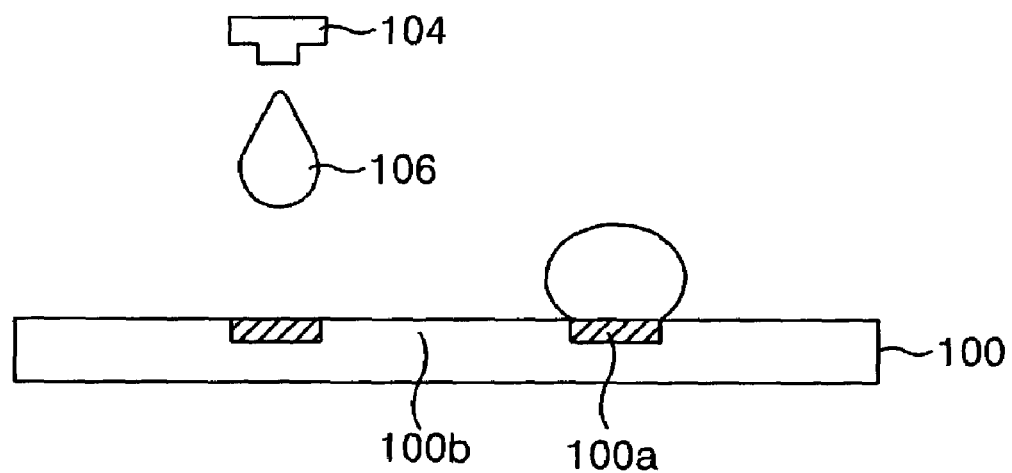

FIG. 10A and FIG. 10B show a method of fabricating a liquid crystal display according to a fifth embodiment of the present invention. Referring to FIGS. 10A and 10B, an ultraviolet ray or an ion beam is radiated on, or a plasma treatment is performed on the surface of a material layer 100 corresponding to a surface area 100a at which a spacer is to be formed. To provide the spacer on the material layer 100 of the upper plate in correspondence with the black matrix area or to an area of the lower plate of an LCD panel in which the pixel electrode is not present, and to provide a suitable height of a cell gap, a ratio of a height of the spacer extending from the upper plate to a width of the spacer on the upper plate should be sufficiently large to maintain the aperture and contrast of the LCD panel. To increase the height to width ratio of the jetted spacer, the contact angle should be large. However, if a contact angle between the spacer material and the surface of the substrate 100 is too large, then the spacer may be easily separated from the substrate 100 even though the spacer is formed on the substrate 100. For the purpose of preventing separation while increasing the contact angle, an ultraviolet ray is selectively radiated only on a surface area 100a to change the hydrostatic property of a surface of the material layer 100 where a spacer will be positioned, thereby enhancing an adhesive force while increasing the contact angle between the material layer 100 and the spacer.

More specifically, as shown in FIG. 10A, a mask 102 having light transmitting parts 102a and light shielding parts 102b arranged alternately is aligned to the material layer 100. The light transmitting part 102a of the mask 102 corresponds to a surface area 100a at which a spacer is to be formed while the light shielding part 102b corresponds to peripheral material layer area 100b on which a spacer will not be formed. Thereafter, an ultraviolet ray or an ion beam is radiated such that the ultraviolet ray or an ion beam passes through the light transmitting part 102a and changes a property of the surface area 100a of the surface of the material layer 100 to thereby enhance an adhesive force between the spacer and the material layer 100. On the other hand, an area 100b in which an ultraviolet ray is not radiated has a hydrostatic property that repulses the spacer material. In the alternative, the surface property can be changed by a plasma treatment instead of a light treatment. Thus, a surface area 100a of the material layer on which spacers will be formed is changed from a hydrophobic property to a hydrophilic property by the surface area treatment. Accordingly, a surface area 100a of the material layer 100 has a different hydrostatic property from the peripheral material layer areas 100b corresponding to a surface of the material layer 100 other than on which a spacer will be formed.

Subsequently, as shown in FIG. 10B, a hydrophilic spacer material 106 is jetted onto the surface areas 100a through a nozzle of the ink-jet device. Since the hydrophilic spacer material 106 has a hydrostatic property different than the peripheral material layer area 100b, the spacer material 106 has a large contact angle due to the difference of hydrostatic properties between the peripheral material layer area 100b and the spacer material. In addition, the hydrophilic spacer material 106 has good adhesion due to the substrate 100a and the spacer material 106 having the same hydrostatic property.

Figure 11A:
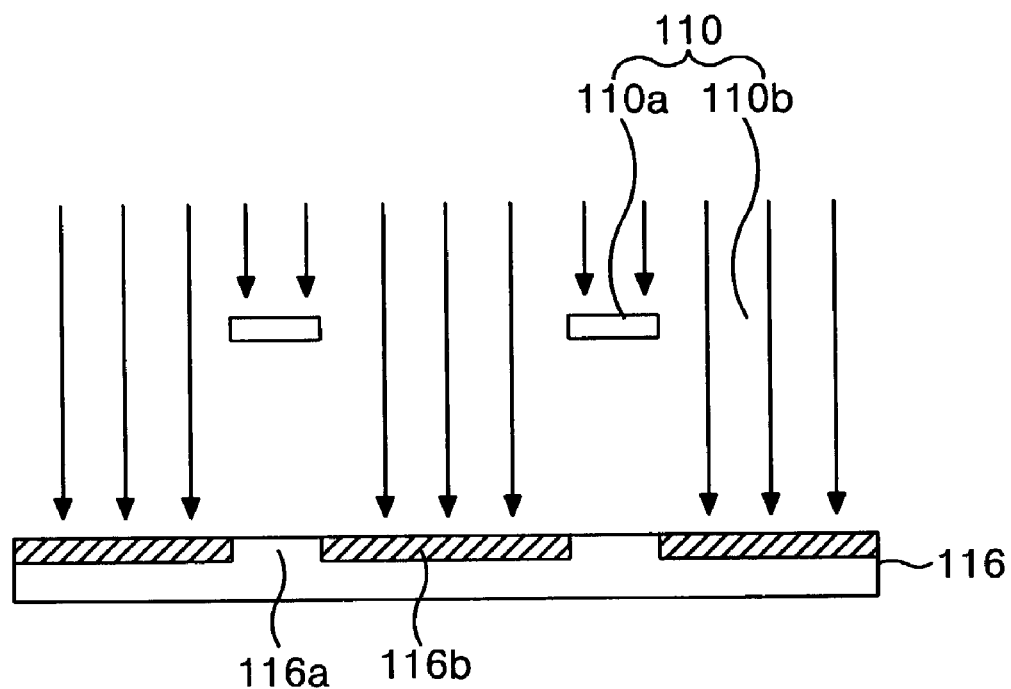
FIGS. 11A to 11B depict a method of fabricating a liquid crystal display according to a sixth embodiment of the present invention.
Figure 11B:
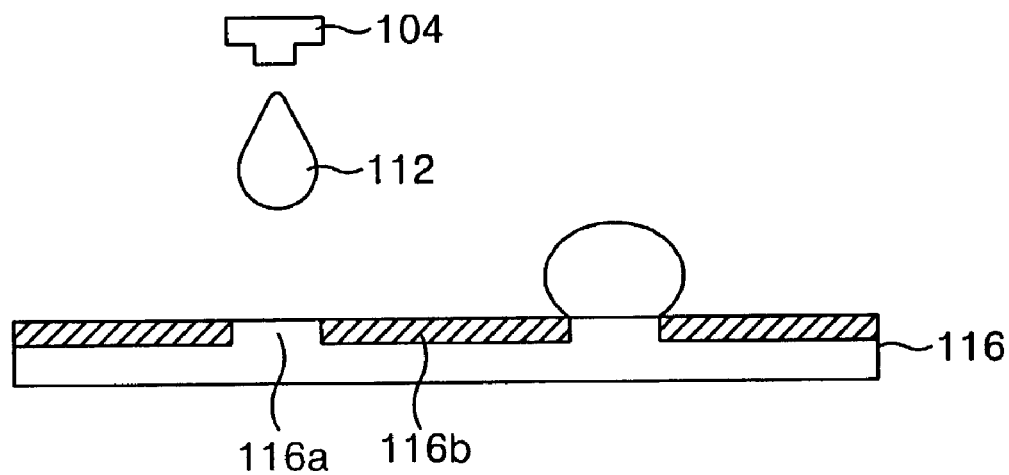

FIGS. 11A and 11B show a method of fabricating a liquid crystal display according to a sixth embodiment of the present invention. Referring to FIG. 11A and FIG. 11B, an ultraviolet ray or an ion beam is radiated on or a plasma treatment is performed on peripheral material layer areas 116b other than surface areas 116a at which spacers are to be formed. To increase the height to width ratio of the jetted spacer, the contact angle should be large. However, if a contact angle between the spacer material and the surface of the material layer 116 is too large, the spacer may be easily separated from the material layer 116. For the purpose of preventing separation while increasing the contact angle, an ultraviolet ray is selectively radiated only on peripheral material layer area 116b other than surface areas 116a at which spacer are to be formed, thereby enhancing an adhesive force while increasing the contact angle between the material layer 116 and the spacer.

More specifically, as shown in FIG. 11A, a mask 110 having a light shielding part 110a and a light transmitting part 110b arranged alternately is aligned to the material layer 116. The light transmitting part 110b of the mask 110 corresponds to an peripheral material layer area 116b other than a surface area at which the spacer is to be formed while the light shielding part 110a corresponds to a surface area 116a at which the spacer is to be formed.

Thereafter, an ultraviolet ray or an ion beam is radiated. The ultraviolet ray or ion beam passing through the light transmitting part 110b changes a surface property of said peripheral material layer area 116b, thereby changing the surface of the material layer 116 to have a large contact angle. In the alternative, the surface property can be changed by a plasma treatment instead of a light or ion beam treatment. On the other hand, the surface area 116a onto which the ultraviolet ray is not radiated has an advantage in that an adhesive force is increased between the spacer and the material layer 116. Thus, the surface area 116a of the surface on material layer 116 has a hydrostatic property different from the peripheral material layer area 116b.

Subsequently, as shown in FIG. 11B, a hydrophilic spacer material 112 is jetted onto the surface area 116a by means of the ink-jet device 104. Since the surface area 116a and the peripheral material layer area 116b have a different surface property from each other, a spacer material 112 jetted from the ink-jet device 104 is formed only at the spacer formation area 116a. Thus, the hydrophilic spacer material 112 is formed to be higher than the related art, so that the height of the spacer 11 2 increases relative to its width. Therefore, the spacer material 112 has good adhesion to the material layer 116. Accordingly, it becomes possible to easily make the spacer 112 corresponding to a desired suitable height for a cell gap in an LCD panel.

As described above, according to the present embodiment, a hydrostatic property of the substrate on which the spacer is formed is made different from that of the spacer material. Accordingly, the spacer can be formed with good adhesion, is formed at a large height owing to a repulsion force between the substrate and the spacer. In other words, it is possible to more easily obtain a height for a spacer having good adhesion to a substrate for maintaining cell gap while also maintaining aperture size for the cells of a LCD panel.

It will be apparent to those skilled in the art that various modifications and variations can be made in the apparatus and method for fabricating a liquid crystal display of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   an upper substrate;
   a lower substrate;
   a liquid crystal layer between the upper and lower substrates;
   a transparent electrode provided on at least one of the upper and lower substrates, wherein the transparent electrode is treated to have a first type of hydrostatic property; and
   a spacer material jetted onto the transparent electrode by an ink-jet system, wherein the spacer material has a second type of hydrostatic property different from the first type of hydrostatic property of the transparent electrode, and wherein the first type of hydrostatic property is hydrophilic and the second type of hydrostatic property is hydrophobic.

2. The liquid crystal display device of claim 1, wherein the first type of hydrostatic property is hydrophobic and the second type of hydrostatic property is hydrophilic.

3. The liquid crystal display device of claim 1, wherein the jetted spacer material includes a flattened lower portion in contact with the transparent electrode of the one of the upper and lower substrates and a curved upper portion contacting the other one upper and lower substrates.

4. The liquid crystal display device of claim 1, wherein the transparent electrode includes a surface treated portion with the first hydrostatic property, the surface treated portion having a different hydrostatic property than other portions of the transparent electrode.

5. A liquid crystal display device, comprising:
   an upper substrate;
   a lower substrate;
   a liquid crystal layer between the upper and lower substrates;
   a material layer with a surface that has a first surface area portion with a first type of hydrostatic property and a second surface area portion with a second type of hydrostatic property; and
   a spacer jetted onto the material layer by an ink-jet system and having a second type of hydrostatic property different from the first type of hydrostatic property,
   wherein the first type of hydrostatic property is hydrophilic and the second type of hydrostatic property is hydrophobic.

6. The liquid crystal display device of claim 5, wherein the material layer is one of a transparent electrode layer, an organic film and an inorganic film.

7. The liquid crystal display device of claim 5, wherein the first surface area is an area on which the spacer is positioned.

8. The liquid crystal display device as claimed in claim 7, wherein a remaining surface area of the material layer other than the surface area on which the spacer is positioned, has a first type of hydrostatic property.

9. The liquid crystal display device of claim 5, wherein the jetted spacer includes a flattened lower portion in contact with the material layer of the one upper and lower substrates and a curved upper portion contacting the other one of the upper and lower substrates.

10. The liquid crystal display device of claim 5, wherein the first surface area of the material layer includes a surface treated portion with the first hydrostatic property, the surface treated portion having a different hydrostatic property than other portions of the material layer.

11. A liquid crystal display device, comprising:
an upper substrate;
a lower substrate;
a liquid crystal layer between the upper and lower substrates;
a material having a first type of hydrostatic property provided on at least one of the upper and lower substrates; and
a spacer between the upper and lower substrates having a second type of hydrostatic property different from the first type of hydrostatic property,
wherein the first type of hydrostatic property is hydrophilic and the second type of hydrostatic property is hydrophobic.

12. The liquid crystal display device of claim 11, wherein the spacer includes a flattened lower portion in contact with the material of the one of the upper and lower substrates and a curved upper portion contacting the other one of the upper and lower substrates.

13. The liquid crystal display device of claim 11, wherein the material includes a surface treated portion with the first hydrostatic property, the surface treated portion having a different hydrostatic property than other portions of the material.

14. The liquid crystal display device of claim 11, wherein the material is one of a transparent electrode layer, an organic film and an inorganic film.

15. The liquid crystal display device of claim 11, wherein the spacer is positioned at a portion one of the upper and lower substrates having the material.

* * * * *